United States Patent
Tang

(10) Patent No.: US 8,601,045 B2
(45) Date of Patent: Dec. 3, 2013

(54) APPARATUS AND METHOD FOR SPLIT-RADIX-2/8 FAST FOURIER TRANSFORM

(75) Inventor: Heng-Tai Tang, Yangmei (TW)

(73) Assignee: Novatek Microelectronics Corp., Hsinchu (TW)

( * ) Notice: Subject to any disclaimer, the term of this patent is extended or adjusted under 35 U.S.C. 154(b) by 486 days.

(21) Appl. No.: 13/048,344

(22) Filed: Mar. 15, 2011

(65) Prior Publication Data

US 2012/0011184 A1     Jan. 12, 2012

(30) Foreign Application Priority Data

Jul. 12, 2010    (TW) ................................ 99122897 A

(51) Int. Cl.
*G06F 17/14*     (2006.01)

(52) U.S. Cl.
USPC .......................................................... 708/404

(58) Field of Classification Search
None
See application file for complete search history.

(56) References Cited

U.S. PATENT DOCUMENTS

| | | | | |
|---|---|---|---|---|
| 6,061,705 A * | 5/2000 | Hellberg | | 708/408 |
| 7,702,712 B2 * | 4/2010 | Krishnamoorthi et al. | ... | 708/404 |
| 2005/0182806 A1 * | 8/2005 | Krishnamoorthi et al. | ... | 708/404 |
| 2006/0010188 A1 * | 1/2006 | Solomon et al. | | 708/400 |
| 2007/0266070 A1 | 11/2007 | Sung et al. | | |
| 2010/0030831 A1 * | 2/2010 | Standfield | | 708/404 |
| 2010/0191791 A1 * | 7/2010 | Patel et al. | | 708/401 |
| 2012/0011184 A1 * | 1/2012 | Tang | | 708/404 |
| 2013/0066932 A1 * | 3/2013 | Kwong et al. | | 708/204 |

OTHER PUBLICATIONS

Tze-Yun Sung et al., "Reconfigurable VLSI Architecture for FFT Processor", WSEAS Transactions on Circuits and Systems, No. 6, vol. 8, Jun. 2009.

* cited by examiner

*Primary Examiner* — David H Malzahn
(74) *Attorney, Agent, or Firm* — Rabin & Berdo, P.C.

(57) ABSTRACT

An SR-2/8 FFT apparatus includes a memory, an SRFFT processor and a control unit. The control unit includes an input control block, an SRFFT control block and an output control block. The input control block loads memory banks with the input data in a first order, such that the SRFFT processor is able to retrieve data from the memory banks simultaneously in a single clock cycle. The SRFFT control block determines a decomposition structure of a $2^M$-point FFT and controls the SRFFT processor to repeatedly perform a butterfly computation along the decomposition structure. The order of the input data of each butterfly computation fits in with the first order. The SRFFT control block controls output results of each butterfly computation to be written back into the memory banks corresponding to the input data. The output control block controls the output results to be outputted in a second order.

12 Claims, 8 Drawing Sheets

APPARATUS AND METHOD FOR SPLIT-RADIX-2/8 FAST FOURIER TRANSFORM

This application claims the benefit of Taiwan application Serial No. 99122897, filed Jul. 12, 2010, the subject matter of which is incorporated herein by reference.

BACKGROUND

1. Technical Field

The invention relates in general to an apparatus and a method for split-radix-2/8 Fast Fourier Transform.

2. Background

Fast Fourier Transform (FFT) is often used in real-time applications for the digital signal processing. An orthogonal frequency division multiplexer (OFDM) system is widely used in European Digital Video Broadcasting terrestrial (DVB-T)/Digital Audio Broadcasting (DAB) standard, and a dedicated FFT/IFFT processing unit is further suitable for the OFDM system and the digital communication to obtain wide frequency range.

It is well known that in the FFT algorithm, the split-radix-2/8 (SR-2/8) FFT algorithm can save about ⅓ complex multiplication compared with the radix-4 FFT. The SR-2/8 FFT is shown as the following even FFT terms and odd FFT terms. Referring concurrently now to FIGS. 6 and 7, FIG. 6 shows a schematic illustration illustrating a decimation in frequency (DIF) SR-8 butterfly computation, and FIG. 7 shows a schematic illustration illustrating a decimation in time (DIT) SR-8 butterfly computation.

$$X(2k) = \sum_{n=0}^{N/2-1} \left(x(n) + x\left(n + \frac{N}{2}\right)\right) W_{N/2}^{nk}$$

where $W_{N/2} = e^{-j\frac{2\pi}{N/2}}$ and $k = 0, 1, 2, \ldots, (N/2) - 1$ (even $FFT$ term)

And $$X(8k+l) = \sum_{n=0}^{N/8-1} \left( \begin{array}{c} \left(x(n) + x\left(n + \frac{2N}{8}\right)W_4^l + x\left(n + \frac{4N}{8}\right)W_4^{2l} + x\left(n + \frac{6N}{8}\right)W_4^{-l}\right) + \\ \left( \begin{array}{c} x\left(n + \frac{N}{8}\right) + x\left(n + \frac{3N}{8}\right)W_4^l + \\ x\left(n + \frac{5N}{8}\right)W_4^{2l} + x\left(n + \frac{7N}{8}\right)W_4^{-l} \end{array} \right) W_8^{-l} \end{array} \right) W_N^{nl} W_{N/8}^{nk}$$

where $k = 0, 1, 2, \ldots, (N/8) - 1$ and $l = 1, 3, 5, 7$ (odd $FFT$ term)

Thus, the SR-2/8 algorithm can make use of resources or time more efficiently. However, the irregular decomposition structure of the SR-2/8 FFT algorithm causes that the SR-2/8 FFT is hard to be implemented in hardware, and the SR-2/8 FFT is generally regarded as more suitably to be implemented in software.

Take the SR-2/4 FFT algorithm as being exemplified. Butterfly processors of the SR-2/4 FFT and the radix-4 FFT both have 4 inputs and 4 outputs. Corresponding to a fixed input clock and limited hardware resources, data accessing between the memory and the butterfly processor has to be as fast as possible. The maximum speed of the FFT can be obtained by simultaneously reading and writing the 4 inputs of the butterfly processor of the SR-2/4 FFT; thus each butterfly computation only consumes only one clock cycle.

Assume that the memory includes 4 memory banks. An input data sequence of a DIT radix-4 butterfly as the butterfly processor of the radix-4 FFT processes 16 pieces of input data is shown in Table 1.

TABLE 1

| Stage 1 | Stage 2 |
|---|---|
| (0, 8, 4, 12) | (0, 2, 1, 3) |
| (1, 9, 5, 13) | (8, 10, 9, 11) |
| (2, 10, 6, 14) | (4, 6, 5, 7) |
| (3, 11, 7, 15) | (12, 14, 13, 15) |

In Table 1, before stage 1 starts, data 0 to data 3 are located in the memory bank 0, data 8 to data 11 are located in the memory bank 1, data 4 to data 7 are located in the memory bank 2, and data 12 to data 15 are located in the memory bank 3. Therefore, the 4 inputs of the radix-4 butterfly processor can simultaneously read data, such as (0, 8, 4, 12), in a single clock cycle at stage 1. However, at stage 2, the radix-4 butterfly processor needs to take 4 clock cycles to read data, such as (0, 2, 1, 3) from the memory. Consequently, the speed of the entire FFT operation slows down, thus lowering the overall system performance.

SUMMARY

The disclosure is directed to an apparatus and a method for split-radix-2/8 (SR-2/8) Fast Fourier Transform (FFT), utilizing memory management to make a split-radix FFT processor be able to simultaneously retrieve multiple pieces of data from a memory or to simultaneously write the pieces of data into the memory in one single clock cycle, and utilizing a regular decomposition structure to implement the split-radix FFT processor in low cost hardware.

According to a first aspect of the present disclosure, an SR-2/8 FFT apparatus is provided. The SR-2/8 FFT apparatus includes a memory, a SRFFT processor and a control unit. The memory includes multiple memory banks and is used for receiving $2^M$ pieces of input data each having an original address. M is a positive integer. The SRFFT processor is used for performing a decimation in time (DIT) SR butterfly computation. The control unit includes an input control block, an SRFFT control block and an output control block. The input control block is used for determining a first order according to numbers of the memory banks and bit-reversed addresses of the original addresses, and for controlling the memory to load the memory banks corresponding to the first order with the input data in the first order, such that the SRFFT processor is able to retrieve data from the memory banks simultaneously in a single clock cycle. The SRFFT control block is used for determining a decomposition structure of a $2^M$-point FFT corresponding to the $2^M$ pieces of input data, and for controlling the SRFFT processor to repeatedly perform the butterfly computation along the decomposition structure. The order of the input data of each butterfly computation fits in with the first order. The SRFFT control block is further used for controlling output results of each butterfly computation to be written back into the memory banks corresponding to the input data. The output control block is used for determining a second order according to the numbers of the memory banks and original addresses of $2^M$ pieces of output data after the DIT SR butterfly computation is finished, and for controlling the output results written and stored in the memory banks to be outputted in the second order as the $2^M$ pieces of output data. The output results included in the $2^M$ pieces of output data sequentially correspond to the $2^M$ pieces of input data in the first order.

According to a second aspect of the present disclosure, an SR-2/8 FFT method is provided. The SR-2/8 FFT method is applied to an SR-2/8 FFT apparatus including a memory, a SRFFT processor and a control unit. The memory includes multiple memory banks; the SRFFT processor is used for performing a DIT SR butterfly computation; the control unit includes an input control block, an SRFFT control block and an output control block. The SR-2/8 FFT method includes the following steps. The memory is utilized to receive $2^M$ pieces of input data each having an original address, and M is a positive integer. The input control block is utilized to determine a first order according to numbers of the memory banks and bit-reversed addresses of the original addresses. The input control block is utilized to control the memory to load the memory banks corresponding to the first order with the input data in the first order, such that the SRFFT processor is able to retrieve data from the memory banks simultaneously in a single clock cycle. The SRFFT control block is utilized to determine a decomposition structure of a $2^M$-point FFT corresponding to the $2^M$ pieces of input data, and to control the SRFFT processor to repeatedly perform the butterfly computation along the decomposition structure. The order of the input data of each butterfly computation fits in with the first order. The SRFFT control block is utilized to write output results of each butterfly computation back into the memory banks corresponding to the input data. The output control block is utilized to determine a second order according to the numbers of the memory banks and original addresses of $2^M$ pieces of output data after the DIT SR butterfly computation is finished, and to control the output results written and stored in the memory banks to be outputted in the second order as the $2^M$ pieces of output data. The output results included in the $2^M$ pieces of output data sequentially correspond to the $2^M$ pieces of input data in the first order.

The invention will become apparent from the following detailed description of the preferred but non-limiting embodiments. The following description is made with reference to the accompanying drawings.

DETAILED DESCRIPTION OF THE INVENTION

The disclosure proposes an apparatus and a method for split-radix-2/8 (SR-2/8) Fast Fourier Transform (FFT), utilizing memory management to make a split-radix FFT processor be able to simultaneously retrieve multiple pieces of data from a memory or to simultaneously write the pieces of data into the memory in one single clock cycle, and utilizing a regular decomposition structure to implement the split-radix FFT processor in low cost hardware.

Figure 1:
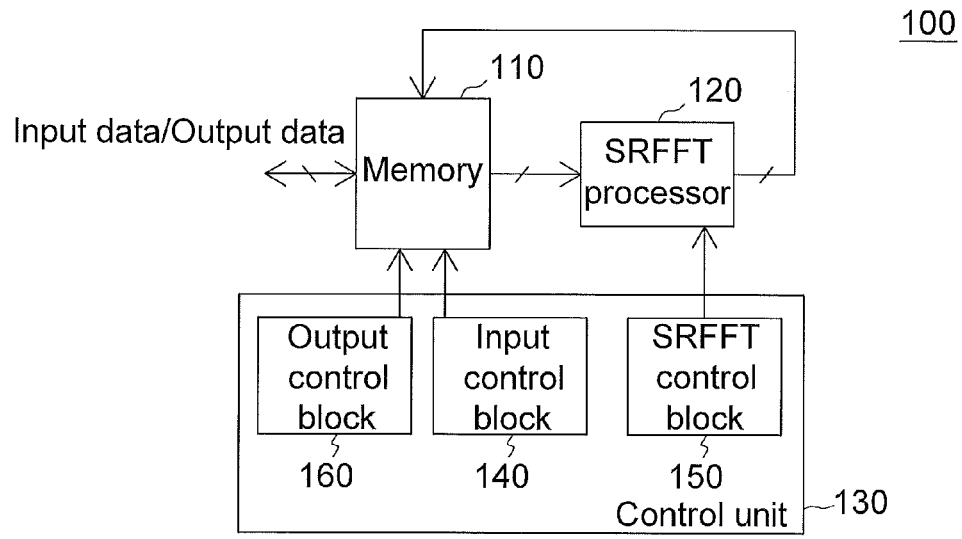
FIG. 1 is a schematic illustration illustrating an SR-2/8 FFT apparatus according to an embodiment.

Referring to FIG. 1, a schematic illustration illustrating an SR-2/8 FFT apparatus according to an embodiment is shown. The SR-2/8 FFT apparatus 100 includes a memory 110, a SRFFT processor 120 and a control unit 130. The memory 100 includes multiple memory banks, and is used for receiving $2^M$ pieces of input data each having an original address, M being a positive integer. Under consideration for cost and efficiency, the memory 100 in the embodiment includes 8 memory banks at most. The SRFFT processor is used for reading data from the memory 100 to perform a decimation in time (DIT) SR butterfly computation.

The control unit 130 includes an input control block 140, an SRFFT control block 150 and an output control block 160. The input control block 140 determines a first order according to numbers of the memory banks included in the memory 110 and bit-reversed addresses of the original addresses of the $2^M$ pieces of input data. Then, the input control block 140 controls the memory 110 to load the memory banks corresponding to the first order with the input data in the first order, such that the SRFFT processor 120 is able to retrieve data from the memory banks simultaneously in a single clock cycle at each stage of the butterfly computation. An address of the input data at the corresponding memory bank is obtained by dividing a value of the bit-reversed address of the input data by the numbers of the memory bank and then taking an integer part of the quotient thereof.

Corresponding to the $2^M$ pieces of input data, the SRFFT processor 120 has to perform a $2^M$-point FFT operation, hence the SRFFT control block 150 determines a decomposition structure of the $2^M$-point FFT. The SRFFT control block 150 decomposes the $2^M$-point FFT to obtain a decomposition execution order according to M stages of the butterfly computation with different radixes, and controls the SRFFT processor 120 to perform the butterfly computation along the decomposition execution order. The butterfly computations with different radixes at each stage can be performed repeatedly, and the order of the input data fed in input terminals of each butterfly computation fits in with the first order.

When the SRFFT processor 120 performs an SR-8 butterfly computation, the SRFFT control block 150 generates 4 twiddle factors for the SR-8 butterfly computation, such that last 4 inputs of the SR-8 butterfly computation are respectively rotated by specific angles. The 4 twiddle factors are, for example, $W_{1/N}$, $W_{5/N}$, $W_{3/N}$, and $W_{7/N}$, wherein $$W_{k/N} = e^{-j\frac{2k\pi}{N}}.$$

After each butterfly computation is finished, the SRFFT control block 150 controls output results of each butterfly computation to be written back into the memory banks corresponding to the input data.

After the SRFFT processor 120 finishes the DIT SR butterfly computation along the decomposition execution order, the output control block 160 determines a second order according to the numbers of the memory banks included in the memory 110 and original addresses of $2^M$ pieces of output data. Then, the output control block 160 controls each of the output results written and stored in the memory banks to be outputted in the second order as the $2^M$ pieces of output data, the output results comprised in the $2^M$ pieces of output data sequentially corresponding to the $2^M$ pieces of input data in the first order. An address of the output data at the read memory bank that the output data is written and stored back into is obtained by dividing a value of the original address of the output data by the numbers of the memory bank and then taking an integer part of the quotient thereof.

Figure 2:
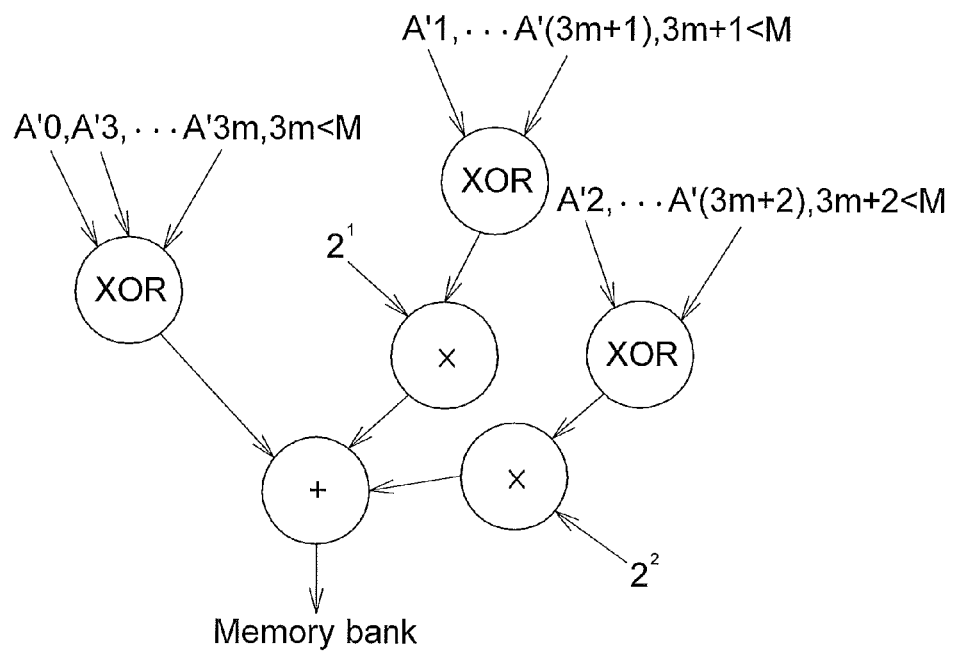
FIG. 2 is a schematic illustration illustrating part of the operation flow of a first order according to an embodiment.

Then take 16 (M is equal to 4) pieces of input data and the memory 110 including 8 memory banks as being exemplified, but it is not limited thereto. Assume that the 16 pieces of input data are x[0] to x[15], and each input data includes an original address A[3:0], that is A3 to A0. Further assume that the 8 memory banks are b0 to b7, and corresponding to the 16 pieces of input data, each memory bank includes two addresses a0 and a1 to store the input data. The input control block 140 determines the first order shown in Table 2 according to the numbers 8 of the memory banks included in the memory 110 and the bit-reversed addresses of the original addresses of the 16 pieces of input data. The address of the input data at the corresponding memory bank is obtained by dividing the value of the bit-reversed address of the input data by the numbers of the memory bank and then taking an integer part of the quotient thereof. Referring now concurrently to FIG. 2, a schematic illustration illustrating part of the operation flow of a first order according to an embodiment is shown. In view of the 8 memory banks, every 3 reversed bits are taken to perform exclusive OR (XOR) operations, and results of the XOR operations are respectively multiplied by 2 to the power and then summed up to obtain the memory bank to be loaded.

TABLE 2

| Input data | Original address (A[3:0]) | Bit-reversed address (A'[3:0]) | (A'3⊕A'0) × $2^0$ + A'1 × $2^1$ + A'2 × $2^2$ | Address at corresponding memory bank (ceil(value of A'[3:0])/8) | First order (memory bank, address) |
|---|---|---|---|---|---|
| X[0] | 0000 | 0000 | 0 | 0 | (b0, a0) |
| X[1] | 0001 | 1000 | 1 | 1 | (b1, a1) |
| X[2] | 0010 | 0100 | 4 | 0 | (b4, a0) |
| X[3] | 0011 | 1100 | 5 | 1 | (b5, a1) |
| X[4] | 0100 | 0010 | 2 | 0 | (b2, a0) |
| X[5] | 0101 | 1010 | 3 | 1 | (b3, a1) |
| X[6] | 0110 | 0110 | 6 | 0 | (b6, a0) |
| X[7] | 0111 | 1110 | 7 | 1 | (b7, a1) |
| X[8] | 1000 | 0001 | 1 | 0 | (b1, a0) |
| X[9] | 1001 | 1001 | 0 | 1 | (b0, a1) |
| X[10] | 1010 | 0101 | 5 | 0 | (b5, a0) |
| X[11] | 1011 | 1101 | 4 | 1 | (b4, a1) |
| X[12] | 1100 | 0011 | 3 | 0 | (b3, a0) |
| X[13] | 1101 | 1011 | 2 | 1 | (b2, a1) |
| X[14] | 1110 | 0111 | 7 | 0 | (b7, a0) |
| X[15] | 1111 | 1111 | 6 | 1 | (b6, a1) |

Figure 3:
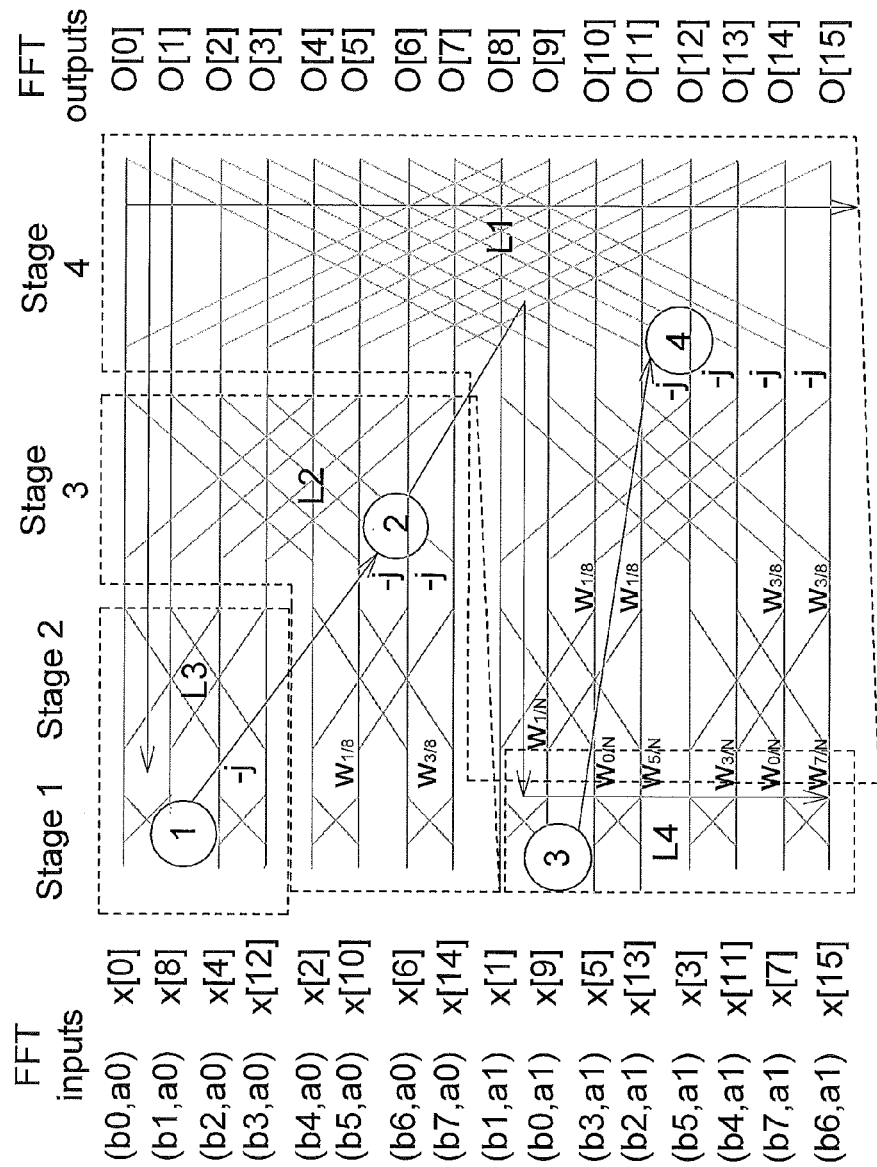
FIG. 3 is a schematic illustration illustrating a 16-point SR-2/8 FFT decomposition structure according to an embodiment.
Figure 4A:
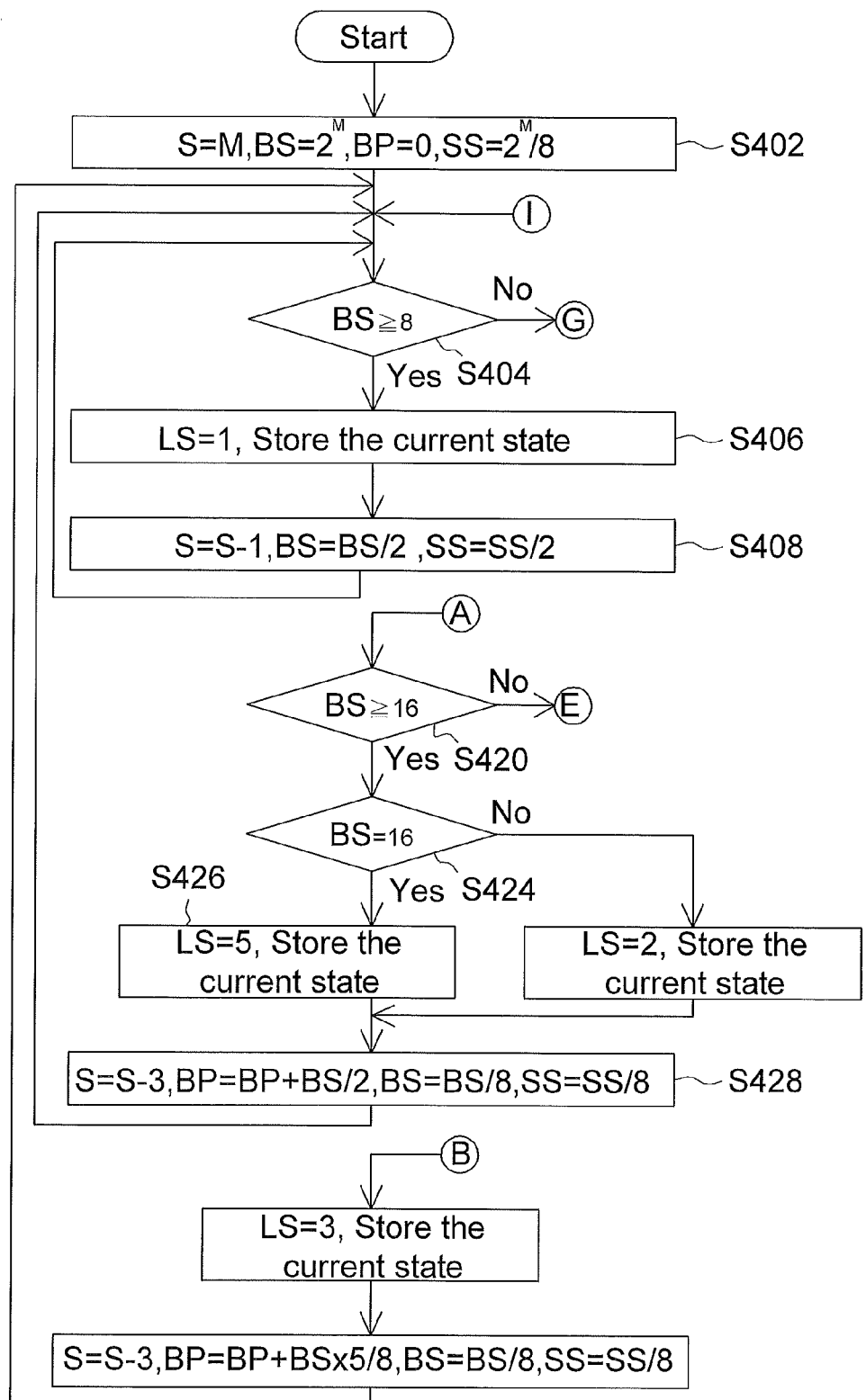
FIGS. 4A to 4F are flow charts showing ways of utilizing a finite state machine to perform an SR-2/8 FFT decomposition structure according to an embodiment.
Figure 4B:
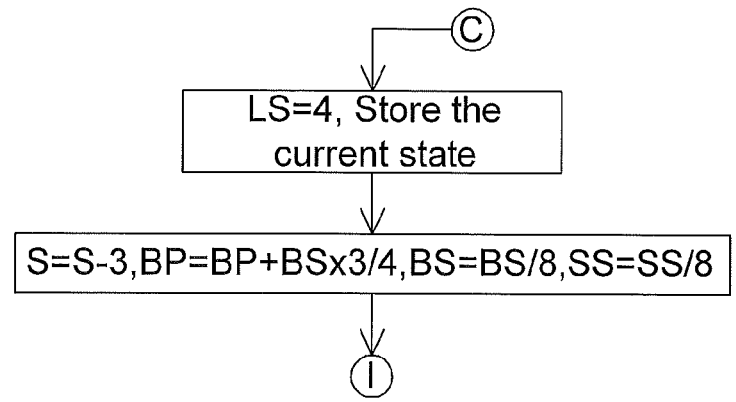
Figure 4C:
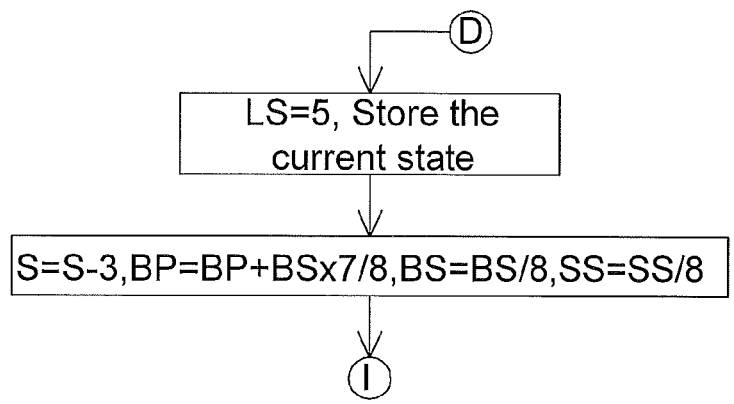
Figure 4D:
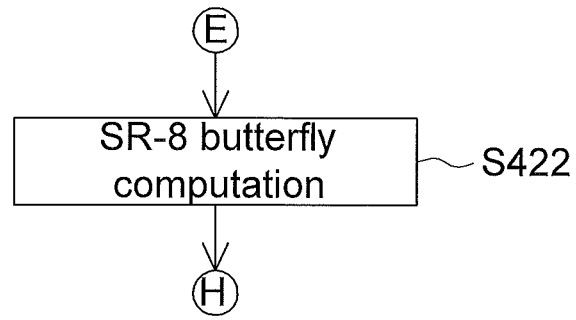
Figure 4E:
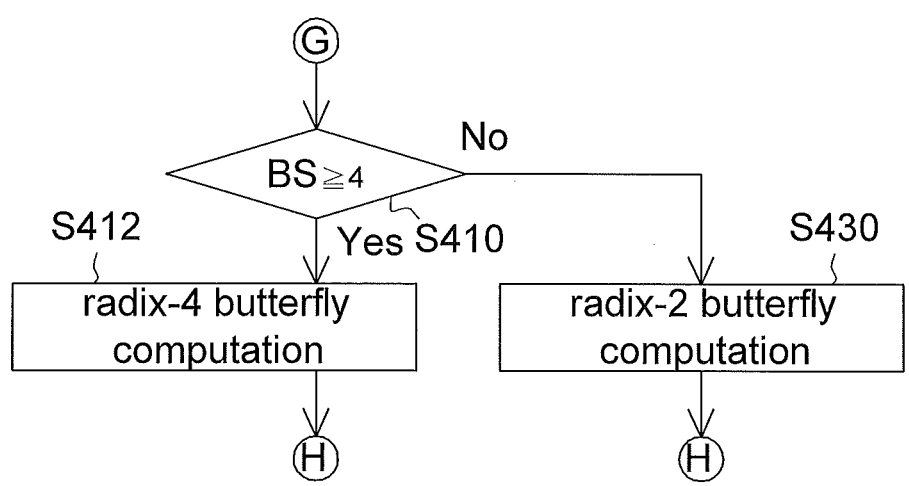
Figure 4F:
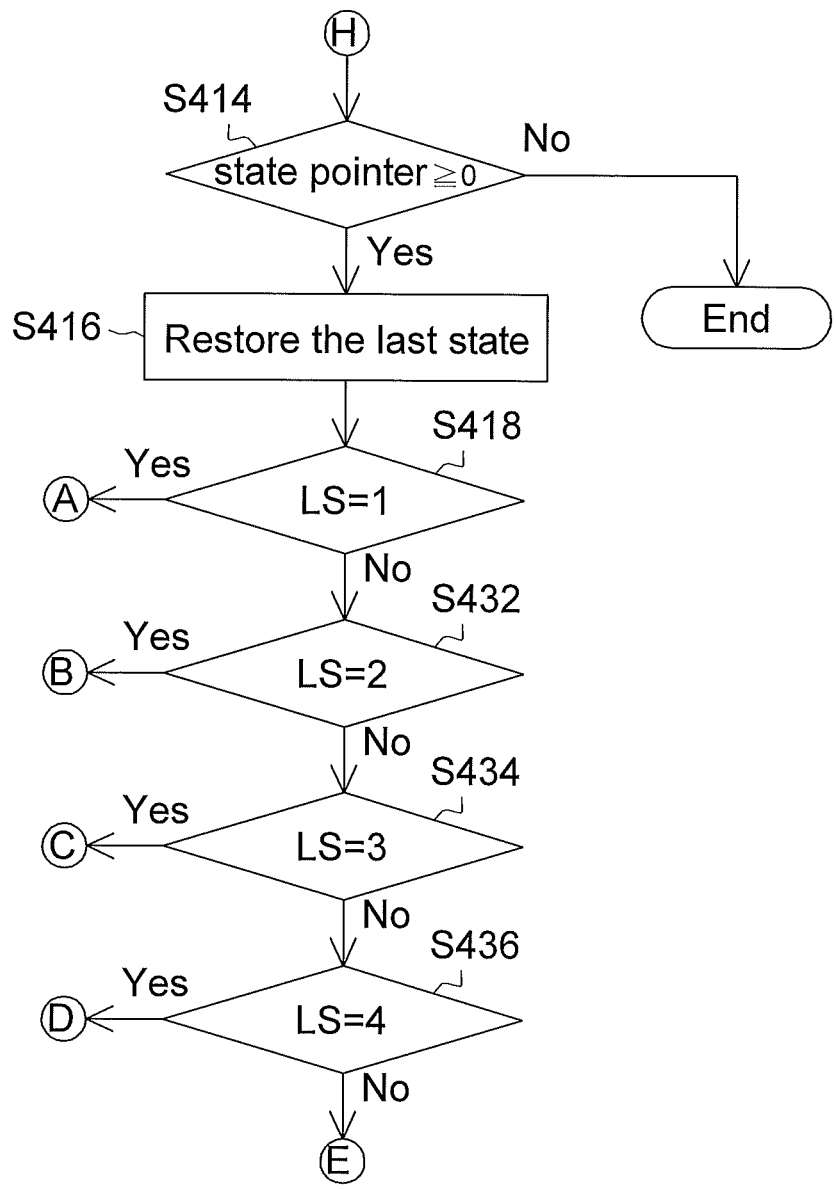

Corresponding to the 16 pieces of input data, the SRFFT processor 120 has to perform a 16-point FFT operation, hence the SRFFT control block 150 determines a decomposition structure of the 16-point FFT. Referring to FIG. 3, a schematic illustration illustrating a 16-point SR-2/8 FFT decomposition structure according to an embodiment is shown. The SRFFT control block 150 decomposes the 16-point FFT to obtain a decomposition execution order (shown as the arrows in FIG. 3) according to 4 stages of the butterfly computation with different radixes. The SRFFT control block 150 controls the SRFFT processor 120 to perform the butterfly computation along the decomposition execution order. The SRFFT control block 150 may be constructed of a finite state machine, and the finite state machine records multiple current states each including multiple variables. The variables include a stage S, a base position BP denoting a start location of the butterfly computation, a block size BS denoting numbers of the data processed at each stage, a sample spacing SS denoting a distance between two inputs at the stage S of the butterfly computation, and a last state LS. The butterfly computations with different radixes at each stage can be performed repeatedly, and the order of the input data fed in input terminals of each butterfly computation fits in with the first order. The memory locations read by the input terminal samples (#0, #1, #2, #3, . . . , #7) of the butterfly computation are obtained by transforming (BP, BP+SS, BP+SS×2, BP+SS×3, . . . , BP+SS×7) in the first order shown in Table 2. The finite state machine may substantially be implemented by a register file cooperated with a state pointer. As often as the current state is stored, 1 is added to the state pointer; as often as the last state is restored, 1 is subtracted from the state pointer.

Referring to FIGS. 4A to 4F, flow charts showing ways of utilizing a finite state machine to perform an SR-2/8 FFT decomposition structure according to an embodiment are shown. On basis of the 16-point SR-2/8 FFT in the embodiment, in step S402, S is equal to 4, BS is equal to 16, BP is equal to 0, and SS is equal to 2. In step S404, BS is equal to 16 and larger than 8, thus it proceeds to step S406. In step S406, LS is equal to 1, the current state is stored, and the state pointer changes to 1. The steps mentioned above correspond to a stage 4 in FIG. 3; however, the butterfly computation at the stage 4 is not performed for the time being. In step S408, S is equal to 3, BS is equal to 8, and SS is equal to 1. It returns to step S404, BS is equal to 8, thus it proceeds to step S406. In step S406, LS is equal to 1, the current state is stored, and the state pointer changes to 2. The steps mentioned above correspond to the stage 4 entering a stage 3 in FIG. 3; however, the butterfly computation at the stage 3 is not performed for the time being.

Then, in step S408, S is equal to 2, BS is equal to 4, and SS is equal to 1. It returns to step S404, BS is equal to 4 and less than 8, thus it connects to step G. In step S410, BS is equal to 4, so it proceeds to step S412, and a radix-4 butterfly computation is performed. The steps mentioned above correspond to the stage 3 entering a stage 2 in FIG. 3. On basis of multiple variables recorded in the current state, the SRFFT processor 120 simultaneously retrieves data x[0], x[8], x[4] and x[12] respectively stored in the memory banks (b0, a0), (b1, a0), (b2, a0) and (b3, a0) for the radix-4 butterfly computation. The SRFFT control block 150 controls output results of the radix-4 butterfly computation to be written back to the memory banks (b0, a0), (b1, a0), (b2, a0) and (b3, a0) as the data x[0], x[8], x[4] and x[12]. Thereafter, it connects to step H.

In step S414, the state pointer is equal to 2 and larger than 0, thus it proceeds to step S416. In step S416, a last state is restored, S is equal to 3, BS is equal to 8, BP is equal to 0, SS is equal to 1, LS is equal to 1, and the state pointer changes to 1. In step S418, because LS is equal to 1, it connects to step A. In step S420, because BS is equal to 8 and less than 16, it connects to step E and proceeds to step S422, and then a SR-8 butterfly computation is performed. The steps mentioned above correspond to the stage 2 returning to the stage 3, and the SRFFT processor 120 simultaneously retrieves data x[0], x[8], x[4], x[12], x[2], x[10], x[6] and x[14] respectively stored in the memory banks (b0, a0), (b1, a0), (b2, a0), (b3, a0), (b4, a0), (b5, a0), (b6, a0) and (b7, a0) for the SR-8 butterfly computation on basis of the many variables recorded in the current state. The SRFFT control block 150 controls output results of the SR-8 butterfly computation to be written back to the memory banks (b0, a0), (b1, a0), (b2, a0), (b3, a0), (b4, a0), (b5, a0), (b6, a0) and (b7, a0) as the data x[0], x[8], x[4], x[12], x[2], x[10], x[6] and x[14]. Thereafter, it connects to step H.

In step S414, the state pointer is equal to 1 and larger than 0, thus it proceeds to step S416. In step S416, the last state is restored, S is equal to 4, BS is equal to 16, BP is equal to 0, SS is equal to 2, LS is equal to 1, and the state pointer changes to 0. In step S418, because LS is equal to 1, it connects to step A. Because BS is equal to 16, it proceeds to step S426 through steps S420 and S424, LS is equal to 5, the current state is stored, and the state pointer changes to 1. Then, in step S428, S is equal to 1, BP is equal to 8, BS is equal to 2, and SS is equal to 1. The steps mentioned above correspond to the stage 3 returning to the stage 4 in FIG. 3; however, the butterfly computation at the stage 4 is not performed for the time being, and it enters a stage 1.

It returns to step S404, BS is equal to 2 and less than 8, thus it connects to step G. In step S410, BS is equal to 2, thus it proceeds to step S430, and radix-2 butterfly computations are performed. The steps mentioned above correspond to the stage 4 entering the sate 1 in FIG. 3, and the SRFFT processor 120 simultaneously retrieves data x[1] and x[9], x[5] and x[13], x[3] and x[11], and x[7] and x[15] respectively stored in the memory banks (b0, a1) and (b1, a1), (b2, a1) and (b3, a1), (b4, a1) and (b5, a1), and (b6, a1) and (b7, a1) for 4 times of the radix-2 butterfly computation on basis of the many variables recorded in the current state. The SRFFT control block 150 controls output results of 4 times of the radix-2 butterfly computation to be written back to the memory banks (b0, a1) and (b1, a1), (b2, a1) and (b3, a1), (b4, a1) and (b5, a1), and (b6, a1) and (b7, a1) as the data x[1] and x[9], x[5] and x[13], x[3] and x[11], and x[7] and x[15]. Thereafter, it connects to step H.

In step S414, the state pointer is equal to 1 and larger than 0, thus it proceeds to step S416. In step S416, the last state is restored, S is equal to 4, BS is equal to 16, BP is equal to 0, SS is equal to 2, LS is equal to 5, and the current pointer changes to 0. In steps S418 and step S432 to S436, because LS is equal to 5, it connects to step E and proceeds to step S422, and the SR-8 butterfly computation is performed. The steps mentioned above correspond to the stage 1 returning to the stage 4, and the SRFFT processor 120 simultaneously retrieves data x[0], x[4], x[2], x[6], x[1], x[5], x[3] and x[7] respectively stored in the memory banks (b0, a0), (b2, a0), (b4, a0), (b6, a0), (b1, a1), (b3, a1), (b5, a1) and (b7, a1) for the SR-8 butterfly computation once on basis of the many variables recorded in the current state. The SRFFT control block 150 controls output results of the SR-8 butterfly computation to be written back to the memory banks (b0, a0), (b2, a0), (b4, a0), (b6, a0), (b1, a1), (b3, a1), (b5, a1) and (b7, a1) as the data X[0], X[4], X[2], X[6], X[1], X[5], X[3] and X[7].

In addition, the SRFFT processor 120 further simultaneously retrieves data x[8], x[12], x[10], x[14], x[9], x[13], x[11] and x[15] respectively stored in the memory banks (b1, a0), (b3, a0), (b5, a0), (b7, a0), (b0, a1), (b2, a1), (b4, a1) and (b6, a1) for the other SR-8 butterfly computation. Before the SR-8 butterfly computation, the data x[9], x[13], x[11] and x[15] are respectively rotated by specific angles by 4 twiddle factors $W_{1/N}$, $W_{5/N}$, $W_{3/N}$, and $W_{7/N}$. The SRFFT control block 150 controls output results of the SR-8 butterfly computation to be written back to the memory banks (b1, a0), (b3, a0), (b5, a0), (b7, a0), (b0, a1), (b2, a1), (b4, a1) and (b6, a1) as the data X[8], X[12], X[10], X[14], X[9], X[13], X[11] and X[15].

Figure 5:
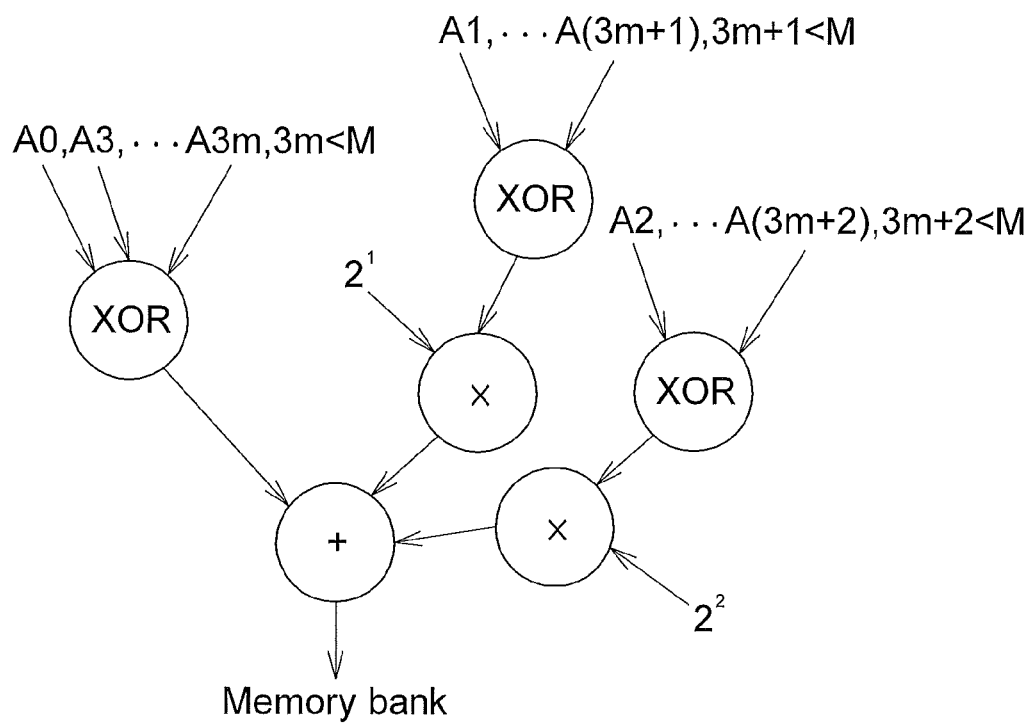
FIG. 5 is a schematic illustration illustrating part of the operation flow of a second order according to an embodiment.
Figure 6:
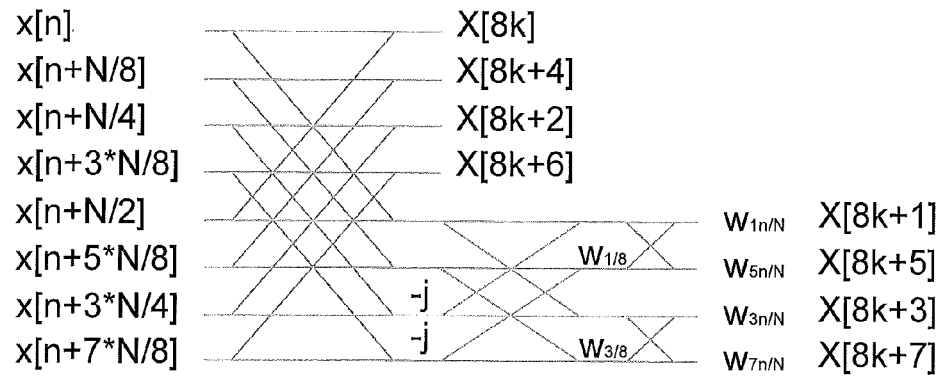
FIG. 6 is a schematic illustration illustrating a decimation in frequency SR-8 butterfly computation
Figure 7:
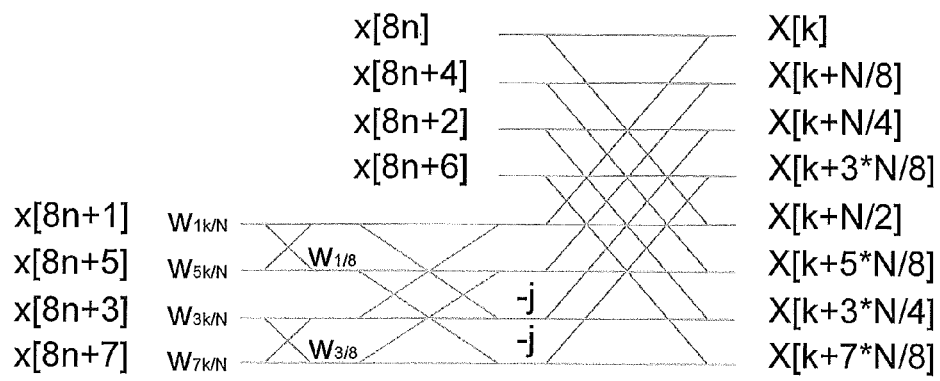
FIG. 7 is a schematic illustration illustrating a decimation in time SR-8 butterfly computation.

As the twice SR-8 butterfly computations are finished, the state pointer changes to −1, thus the SRFFT processor 120 finishes the DIT SR butterfly computation after step S414. At this time, the 16 pieces of output results X[0] to X[15] stored in the 8 memory banks are exactly FFT operation results of the input data x[0] to x[15]. After the SRFFT processor 120 finishes the DIT SR butterfly computation along the decomposition execution order shown in FIG. 3, the output control block 160 determines a second order shown in Table 3 according to the numbers of the memory banks included in the memory 110 and original addresses of 16 pieces of output data. Then, the output control block 160 controls the output results written and stored in the memory banks to be outputted in the second order as the 16 pieces of output data, the output results included in the 16 pieces of output data sequentially corresponding to the 16 pieces of input data in the first order. An address of the output data at the read memory bank that the output data is written and stored back into is obtained by dividing a value of the original address of the output data by the numbers of the memory bank and then taking an integer part of the quotient thereof. Referring concurrently now to FIG. 5, a schematic illustration illustrating part of the operation flow of a second order according to an embodiment is shown. In view of the 8 memory banks, every 3 bits are taken to perform XOR operations, and results of the XOR operations are respectively multiplied by 2 to the power and then summed up to obtain the memory bank to be loaded.

TABLE 3

| Output data | Original address (A[3:0]) | $(A3 \oplus A0) \times 2^0 + A1 \times 2^1 + A2 \times 2^2$ | Address at corresponding memory bank (ceil(value of A'[3:0])/8) | Second order (memory bank, address) | Output results in the second order |
|---|---|---|---|---|---|
| O[0] | 0000 | 0 | 0 | (b0, a0) | X[0] |
| O[1] | 0001 | 1 | 0 | (b1, a0) | X[8] |
| O[2] | 0010 | 2 | 0 | (b2, a0) | X[4] |
| O[3] | 0011 | 3 | 0 | (b3, a0) | X[12] |
| O[4] | 0100 | 4 | 0 | (b4, a0) | X[2] |
| O[5] | 0101 | 5 | 0 | (b5, a0) | X[10] |
| O[6] | 0110 | 6 | 0 | (b6, a0) | X[6] |
| O[7] | 0111 | 7 | 0 | (b7, a0) | X[14] |
| O[8] | 1000 | 1 | 1 | (b1, a1) | X[1] |
| O[9] | 1001 | 0 | 1 | (b0, a1) | X[9] |
| O[10] | 1010 | 3 | 1 | (b3, a1) | X[5] |
| O[11] | 1011 | 2 | 1 | (b2, a1) | X[13] |
| O[12] | 1100 | 5 | 1 | (b5, a1) | X[3] |
| O[13] | 1101 | 4 | 1 | (b4, a1) | X[11] |
| O[14] | 1110 | 7 | 1 | (b7, a1) | X[7] |
| O[15] | 1111 | 6 | 1 | (b6, a1) | X[15] |

It can be observed in FIG. 3 that, the output results included in the 16 pieces of output data sequentially correspond to the 16 pieces of input data in the first order.

In addition, the FFT operation architecture described in the above embodiment is also suitable for a split-radix-2/4 FFT, and the memory 100 correspondingly needs to include 4 memory banks. When the above FFT operation architecture is applied to the SR-2/4 FFT, every 2 reversed bits are taken to perform XOR operations in view of the 4 memory banks in the part of the operation flow of the first order, and results of the XOR operations are respectively multiplied by 2 to the power and then summed up to obtain the memory bank the output data to be loaded.

The disclosure further proposes an SR-2/8 FFT method. The SR-2/8 FFT method is applied to an SR-2/8 FFT apparatus including a memory, a SRFFT processor and a control unit. The memory includes multiple memory banks; the SRFFT processor performs a DIT SR butterfly computation; the control unit includes an input control block, an SRFFT control block and an output control block. The SR-2/8 FFT method includes the following steps. The memory receives $2^M$ pieces of input data each having an original address, and M is a positive integer. The input control block determines a first order according to numbers of the memory banks and bit-reversed addresses of the original addresses. The input control block controls the memory to load the memory banks corresponding to the first order with the input data in the first order, such that the SRFFT processor is able to retrieve data from the memory banks simultaneously in a single clock cycle.

The SRFFT control block determines a decomposition structure of a $2^M$-point FFT corresponding to the $2^M$ pieces of input data, and controls the SRFFT processor to repeatedly perform the butterfly computation along the decomposition structure. The order of the input data of each butterfly computation fits in with the first order. The SRFFT control block writes output results of each butterfly computation back into the memory banks corresponding to the input data. The output control block determines a second order according to the numbers of the memory banks and original addresses of $2^M$ pieces of output data after the DIT SR butterfly computation is finished, and controls the output results written and stored in the memory banks to be outputted in the second order as the $2^M$ pieces of output data. The output results included in the $2^M$ pieces of output data sequentially correspond to the $2^M$ pieces of input data in the first order.

The detailed principles of the above SR-2/8 FFT method have been described in the SR-2/8 FFT apparatus 100 and related descriptions of FIG. 1 to FIG. 5, so detailed description thereof will be omitted.

The apparatus and the method for the SR-2/8 FFT proposed in the disclosure utilize a simple and efficient memory management method to load memory banks of a memory with input data in a specific order, such that a SRFFT processor can simultaneously retrieve multiple pieces of data from the memory in one single clock cycle, thus it does not need to use registers which are more expensive than the memory to store data. In addition, the disclosure also utilizes a finite state machine to implement a regular decomposition structure of the FFT, such that the SRFFT processor can be implemented in low cost hardware. Therefore, the apparatus and the method for the SR-2/8 FFT proposed in the disclosure have advantages of high efficiency and low cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A split-radix-2/8 (SR-2/8) Fast Fourier Transform (FFT) apparatus, comprising:
a memory, comprising a plurality of memory banks, for receiving $2^M$ pieces of input data each having an original address, M being a positive integer;
a split-radix Fast Fourier Transform (SRFFT) processor for performing a decimation in time (DIT) SR butterfly computation; and
a control unit, comprising:
an input control block for determining a first order according to numbers of the memory banks and bit-reversed addresses of the original addresses, and for controlling the memory to load the memory banks corresponding to the first order with the input data in the first order, such that the SRFFT processor is able to retrieve data from the memory banks simultaneously in a single clock cycle;
an SRFFT control block for determining a decomposition structure of a $2^M$-point FFT corresponding to the $2^M$ pieces of input data, and for controlling the SRFFT processor to repeatedly perform the butterfly computation along the decomposition structure, wherein the order of the input data of each butterfly computation fits in with the first order, and the SRFFT control block is further used for controlling output results of each butterfly computation to be written back into the memory banks corresponding to the input data; and
an output control block for determining a second order according to the numbers of the memory banks and original addresses of $2^M$ pieces of output data after the DIT SR butterfly computation is finished, and for controlling the output results written and stored in the memory banks to be outputted in the second order as the $2^M$ pieces of output data, the output results comprised in the $2^M$ pieces of output data sequentially corresponding to the $2^M$ pieces of input data in the first order.

2. The SR-2/8 FFT apparatus according to claim 1, wherein an address of the input data at the corresponding memory bank is obtained by dividing a value of the bit-reversed address of the input data by the numbers of the memory bank and then taking an integer part of the quotient thereof.

3. The SR-2/8 FFT apparatus according to claim 1, wherein when the SRFFT processor performs an SR-8 butterfly computation, the SRFFT control block is further used for generating 4 twiddle factors for the SR-8 butterfly computation, such that last 4 inputs of the SR-8 butterfly computation are respectively rotated by specific angles.

4. The SR-2/8 FFT apparatus according to claim 1, wherein the SRFFT control block decomposes the $2^M$-point FFT to obtain a decomposition execution order according to M stages of the butterfly computation with different radixes, and controls the SRFFT processor to perform the butterfly computation along the decomposition execution order, wherein the butterfly computations with different radixes at each stage can be performed repeatedly, and the order of the input data fed in input terminals of each butterfly computation fits in with the first order.

5. The SR-2/8 FFT apparatus according to claim 4, wherein the SRFFT control block is constructed of a finite state machine, and the finite state machine records a plurality of current states each comprising a plurality of variables, the variables comprising a stage, a base position denoting a start location of the butterfly computation, a block size denoting numbers of the data processed at each stage, a sample space denoting a distance between two inputs at the stage of the butterfly computation, and a last state.

6. The SR-2/8 FFT apparatus according to claim 1, wherein an address of the output data at the read memory bank is obtained by dividing a value of the original address of the output data by the numbers of the memory bank and then taking an integer part of the quotient thereof.

7. A split-radix-2/8 (SR-2/8) Fast Fourier Transform (FFT) method applied to an SR-2/8 FFT apparatus comprising a memory, a split-radix Fast Fourier Transform (SRFFT) processor and a control unit, the memory comprising a plurality of memory banks, the SRFFT processor used for performing a decimation in time (DIT) SR butterfly computation, the control unit comprising an input control block, an SRFFT control block and an output control block, the SR-2/8 FFT method comprising:

utilizing the memory to receive $2^M$ pieces of input data each having an original address, M being a positive integer;

utilizing the input control block to determine a first order according to numbers of the memory banks and bit-reversed addresses of the original addresses;

utilizing the input control block to control the memory to load the memory banks corresponding to the first order with the input data in the first order, such that the SRFFT processor is able to retrieve data from the memory banks simultaneously in a single clock cycle;

utilizing the SRFFT control block to determine a decomposition structure of a $2^M$-point FFT corresponding to the $2^M$ pieces of input data, and to control the SRFFT processor to repeatedly perform the butterfly computation along the decomposition structure, wherein the order of the input data of each butterfly computation fits in with the first order;

utilizing the SRFFT control block to write output results of each butterfly computation back into the memory banks corresponding to the input data; and utilizing the output control block to determine a second order according to the numbers of the memory banks and original addresses of $2^M$ pieces of output data after the DIT SR butterfly computation is finished, and to control the output results written and stored in the memory banks to be outputted in the second order as the $2^M$ pieces of output data, the output results comprised in the $2^M$ pieces of output data sequentially corresponding to the $2^M$ pieces of input data in the first order.

8. The SR-2/8 FFT method according to claim 7, further comprising:

obtaining an address of the input data at the corresponding memory bank by dividing a value of the bit-reversed address of the input data by the numbers of the memory bank and then taking an integer part of the quotient thereof.

9. The SR-2/8 FFT method according to claim 7, further comprising:

utilizing the SRFFT control block to generate 4 twiddle factors for an SR-8 butterfly computation when the SRFFT processor performs the SR-8 butterfly computation, such that last 4 inputs of the SR-8 butterfly computation are respectively rotated by specific angles.

10. The SR-2/8 FFT method according to claim 7, further comprising:

Utilizing the SRFFT control block to decompose the $2^M$-point FFT to obtain a decomposition execution order according to M stages of the butterfly computation with different radixes, and to control the SRFFT processor to perform the butterfly computation along the decomposition execution order, wherein the butterfly computations with different radixes at each stage can be performed repeatedly, and the order of the input data fed in input terminals of each butterfly computation fits in with the first order.

11. The SR-2/8 FFT method according to claim 10, wherein the SRFFT control block is constructed of a finite state machine, and the finite state machine records a plurality of current states each comprising a plurality of variables, the variables comprising a stage, a base position denoting a start location of the butterfly computation, a block size denoting numbers of the data processed at each stage, a sample space denoting a distance between two inputs at the stage of the butterfly computation, and a last state.

12. The SR-2/8 FFT method according to claim 7, further comprising:

obtaining an address of the output data at the read memory bank by dividing a value of the original address of the output data by the numbers of the memory bank and then taking an integer part of the quotient thereof.

* * * * *